(12) United States Patent
Roben

(10) Patent No.: US 8,800,804 B1
(45) Date of Patent: Aug. 12, 2014

(54) COOKWARE WITH DIVIDER

(71) Applicant: Jason Roben, Houston, TX (US)

(72) Inventor: Jason Roben, Houston, TX (US)

(*) Notice: Subject to any disclaimer, the term of this patent is extended or adjusted under 35 U.S.C. 154(b) by 0 days.

(21) Appl. No.: 13/851,425

(22) Filed: Mar. 27, 2013

(51) Int. Cl.
*A47J 36/10* (2006.01)
*A47J 36/06* (2006.01)
*B65D 51/18* (2006.01)

(52) U.S. Cl.
CPC *A47J 36/10* (2013.01); *A47J 36/06* (2013.01); *B65D 51/18* (2013.01)
USPC ............ 220/573.1; 220/259.2; 220/826; 220/212.5; 220/545

(58) Field of Classification Search
CPC .......... A47J 36/10; A47J 36/08; A47J 36/06; B65D 1/36; B65D 51/18
USPC ............ 220/573.1, 912, 526, 524, 523, 548, 220/546, 545, 544, 532, 530, 529, 254.6, 220/254.3, 254.5, 259.2, 259.1, 256.1, 220/23.89, 23.87, 23.83, 212.5, 212, 366.1, 220/367.1, 318, 315, 826, 810
See application file for complete search history.

(56) References Cited

U.S. PATENT DOCUMENTS

| | | | |
|---|---|---|---|
| 166,120 A | 7/1875 | Malin | |
| 508,831 A * | 11/1893 | Nicholls | 99/411 |
| 950,844 A * | 3/1910 | Dolan | 220/524 |
| 1,319,878 A | 10/1919 | Lewis | |
| 1,485,602 A * | 3/1924 | Fleischer | 220/263 |
| 1,519,510 A * | 12/1924 | Santarsiero | 99/416 |
| 1,613,671 A * | 1/1927 | O'Donnell | 220/573.4 |
| 1,630,787 A * | 5/1927 | Cullen | 99/416 |
| 2,223,432 A | 12/1940 | Smith | |
| 2,459,940 A | 1/1949 | Himmel | |
| 2,582,801 A * | 1/1952 | Steen | 126/378.1 |
| 2,770,389 A * | 11/1956 | Drakoff | 99/341 |
| 3,908,535 A * | 9/1975 | Gordon | 99/426 |
| D284,543 S | 7/1986 | Huls | |
| 5,275,094 A * | 1/1994 | Naft | 99/416 |
| 2001/0032856 A1 | 10/2001 | Casey | |
| 2008/0196599 A1* | 8/2008 | Bhagat | 99/444 |
| 2009/0056559 A1 | 3/2009 | Dunham | |
| 2011/0017750 A1 | 1/2011 | Fortkamp | |
| 2013/0112091 A1* | 5/2013 | Page | 99/448 |

OTHER PUBLICATIONS

Circulon "Cook Great, Look Great" 12-Inch Divider Skillet by Devlin Alexander. http://www.amazon.com/Circulon-12-Inch-Divider-Skillet-Alexander/db/B001GQP480/ref=sr_1_1?ie=UTF8 &qid=1338991737&sr=8-1 Accecssed Jun. 6, 2012.
Rachael Ray Hard-Anodized Cookware 12.5 Inch Divided Skillet. http://www.sears.com/rachael-ray-hard-anodized-cookware12. 5inch- divided-skillet-orange/p-00829131000P?prdNo=1 &blockNo=1&blockType=G1 Accessed Jun. 6, 2012.
Slice Solutions 11-by-7-Inch Precut Brownie Pan Set. http://www.amazon.com/Slice-Solutions-7-Inch-Precut-Brownie/dp/B00186YXJO Accessed Jun. 6, 2012.

* cited by examiner

*Primary Examiner* — Robert J Hicks
(74) *Attorney, Agent, or Firm* — Robert C. Montgomery; Montgomery Patent & Design

(57) ABSTRACT

Cookware includes removable divider inserts. A first embodiment of the invention utilizes a grill pattern on the cooking surface of the pan. Once installed, the insert creates separate chambers within the pan. Further, the insert provides an aperture at the base of the pan to allow liquids such as grease to move between chambers. The cookware is also provided with specially adapted lids that are separable into halves.

12 Claims, 7 Drawing Sheets

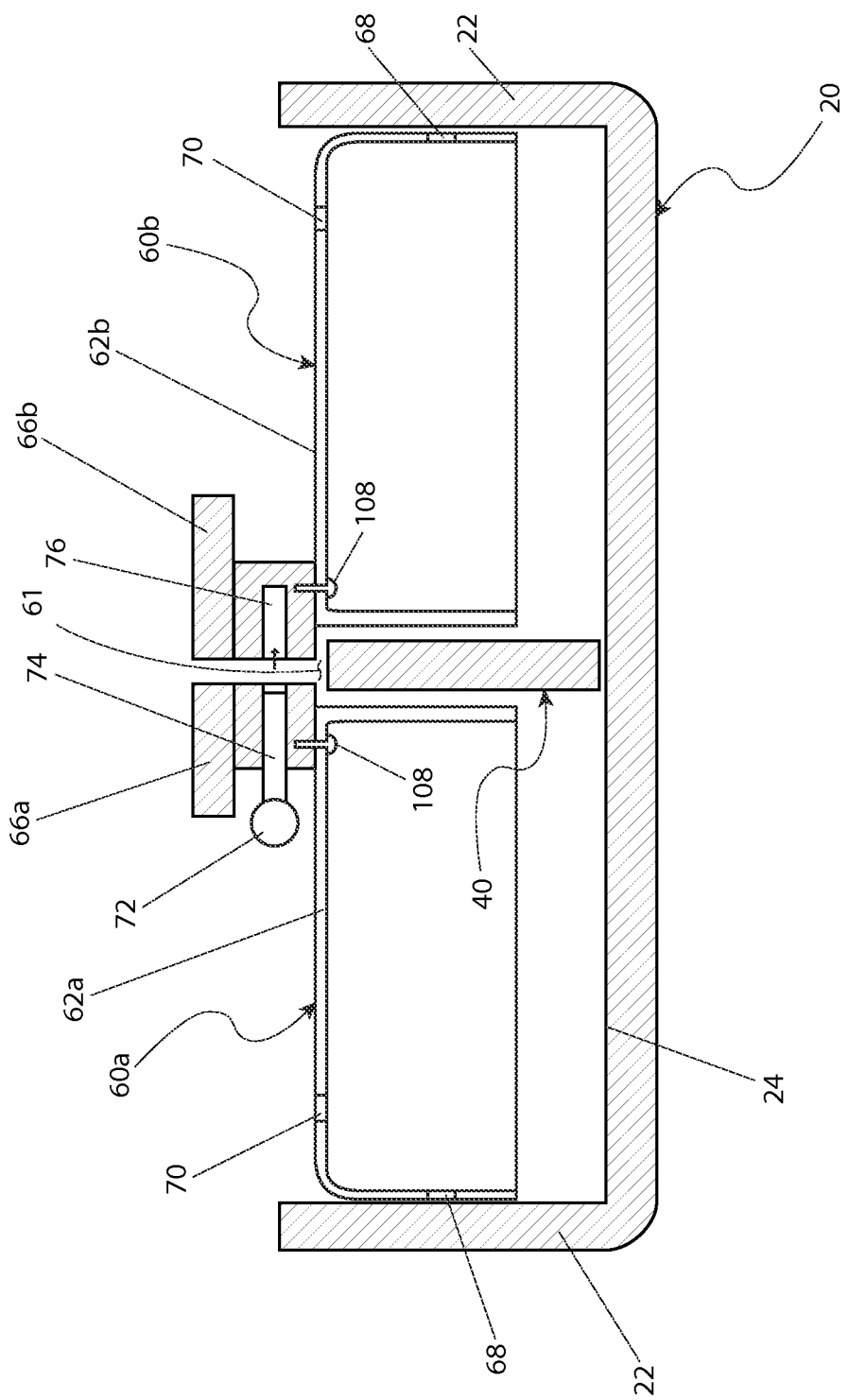

COOKWARE WITH DIVIDER

RELATED APPLICATIONS

Not applicable.

FIELD OF THE INVENTION

The presently disclosed subject matter is directed toward cookware. More particularly, the present invention is directed to cookware having removable dividers for provide separate compartments.

BACKGROUND OF THE INVENTION

All cooks know that to cook you need a cooking vessel: a pot, a pan, a skillet, a wok, a boiler, something to cook the food in. As almost any American culinary person will attest, whether a professional chef or the casual, once-a-year at-home cook, pots, pans, and skillets are basic utensils. While pots, pans and skillets may have different shapes, sizes, handles, lids and materials they are required for almost all food preparation.

For all of the different pots, pans and skillets that are available and their wide range of prices, pots, pans and skillets generally share a common trait; namely, each is capable of cooking or heating only one type of food at a time. This limitation is not true of ovens. Ovens can cook multiple types of food at once. Similarly, plates can serve more than one type of food at a time. The inefficiency of pots, pans and skillets causes cooks to use multiple cooking vessels to bake a cake, to prepare a meal, or to reheat leftovers. This inefficiency results in greater energy use, more effort, increased clean up time, and higher costs when purchasing cooking vessels.

Accordingly, there exists a need for a means by which multiple foods can be cooked, fried, or heated, in a single cooking vessel without unwanted cross-contamination of the various foods. Beneficially such a cooking vessel would have multiple cooking compartments that allow multiple foods to be cooked at the same time. Preferably such a cooking vessel would save time, reduce cooking mess, enable easier clean-up and reduce costs. In practice such cooking vessels would avoid unwanted cross contamination of foods while enabling easy separation of oil, grease and fat, thus enabling healthier eating. Ideally such cooking vessels would either reduce the chance of spill over or would be configured to allow drippings from one food to drain into another section.

SUMMARY OF THE INVENTION

The principles of the present invention provide for cooking vessels having multiple cooking compartments that allow multiple foods to be cooked at the same time. The inventive cooking vessels save time, reduce cooking mess, enable easier clean-up and reduce costs. Such cooking vessels can avoid unwanted cross contamination of foods while enabling easy separation of oil, grease and fat.

A lid assembly that is in accord with the present invention includes a first partial lid having a first lid top and a first lid side extending down from the first lid top to form a first open-bottomed enclosure. The lid assembly further includes a second partial lid having a second lid top and a second lid side extending down from the second lid top to form a second open-bottomed enclosure. The first lid top can include a top steam release aperture while the first lid side can include at least one (1) vent aperture. Beneficially the lid assembly also includes a first handle half on the first lid top and a second handle half on the second lid top. The first handle half and the second handle half are halves of a vertically bisected "T"-shaped knob. When the first partial lid and the second partial lid are located adjacent each other the first handle half and the second handle half emulate the "T" shaped knob. Preferably, the first handle half is attached to the first lid top by a fastener while the first handle half includes a horizontal sliding locking pin with an external integral knob and the second handle half includes a locking pin aperture. When the locking pin slides into the pin aperture the first handle half and the second handle half are joined together.

A cookware assembly that is in accord with the present invention includes a vertical side having lock receiving features, a bottom, and a removable vertical divider assembly having a body and a locking attachment for attaching the body to the vertical side using the lock receiving feature.

Preferably the divider assembly includes at least one (1) drain aperture for allowing fluids to migrate under the divider assembly. Additionally, the locking attachment includes a first locking rod, a second locking rod, and a spring biasing the first locking rod away from the second locking rod. In practice the lock receiving features are rod apertures for receiving the first locking rod and the second locking rod. Beneficially, a first actuating pin is attached to the first locking rod and a second actuating pin is attached to the second locking rod. When the first actuating pin and the second actuating pin are pinched together the first locking rod and the second locking rod move toward one (1) another. The bottom may include a plurality of ribs. If so, the bottom can include an inclined upper ribbed bottom and a lower inclined flat bottom.

A cookware vessel that is in accord with the present invention includes a vertical side having a top and lock aperture, a bottom, a removable vertical divider assembly having a body and a locking attachment for attaching to the vertical side using the lock apertures. The cooking vessel further includes a lid assembly having a first partial lid with a first lid top and a first lid side that extends down from the first lid top to form a first open-bottomed enclosure and a second partial lid having a second lid top and a second lid side that extends down from the second lid top to form a second open-bottomed enclosure. The lid assembly fits on the top.

The divider assembly may include at least one (1) drain aperture for allowing fluids to migrate under the divider assembly. The locking attachment can include a first locking rod, a second locking rod, and a spring biasing the first locking rod away from the second locking rod such that the first locking rod and the second locking rod fit into the lock apertures. Beneficially, the bottom may include an inclined upper ribbed bottom and a lower inclined flat bottom.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
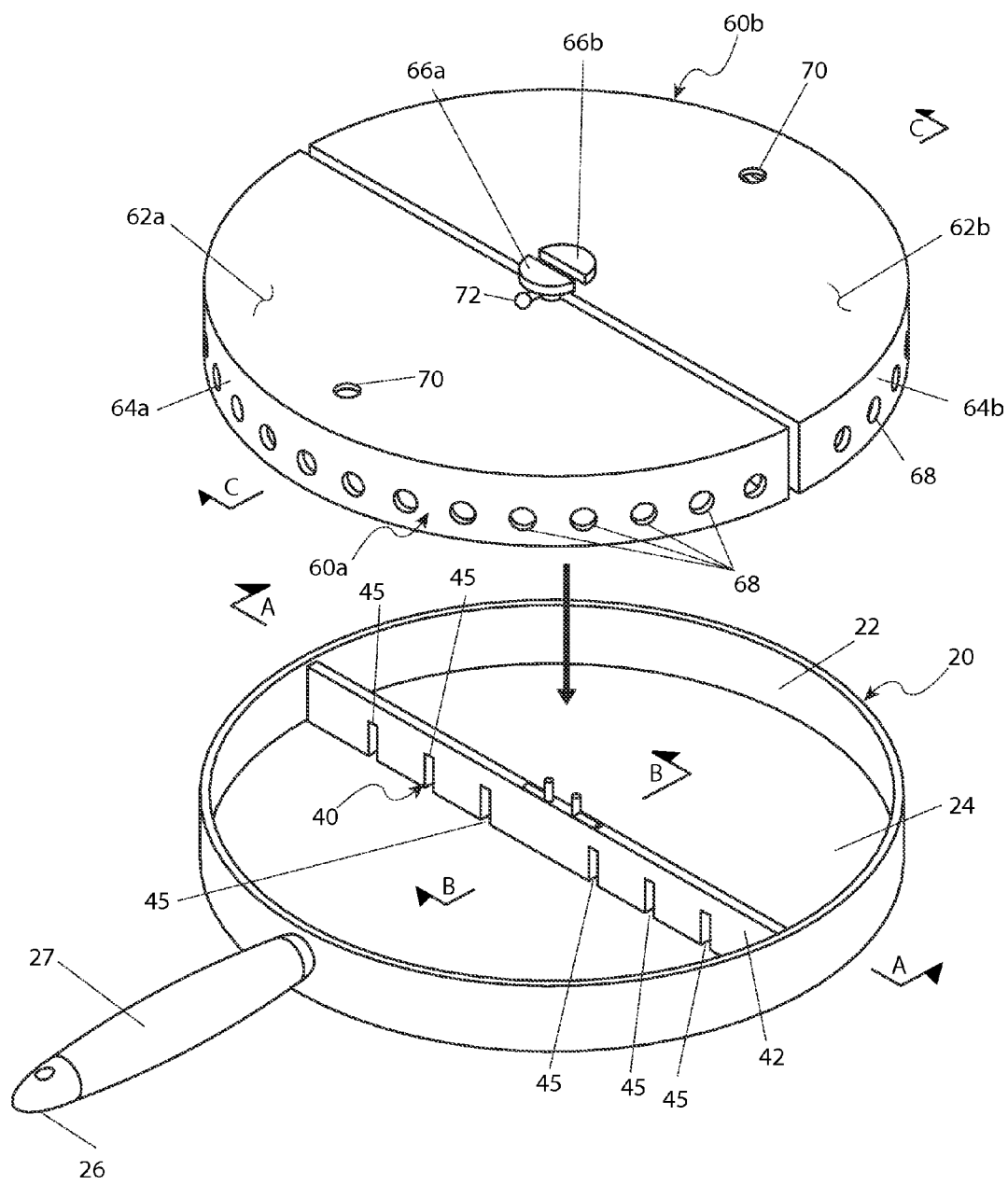
FIG. 1 is a perspective view of a pan embodiment 20 cookware that is in accord with a preferred embodiment of the present invention.

DESCRIPTIVE KEY 20 pan embodiment
22 pan side structure
24 pan bottom structure
26 first handle
27 insulated covering
30 rod aperture
40 first divider assembly
42 body
44 actuating pins
45 drain aperture
46 pin slot
48 locking rod
50 spring
60*a* first half lid
60*b* second half lid
61 clearance gap
62*a* first lid top
62*b* second lid top
64*a* first lid side
64*b* second lid side
66*a* first handle half
66*b* second handle half
68 first vent aperture
70 second vent aperture
72 knob
74 locking pin
76 locking pin aperture
80 skillet embodiment
82 skillet side
84*a* flat bottom
84*b* ribbed bottom
88 rib
92 fluid
94 foodstuff
100 pot embodiment
102 pot side structure
104 second divider assembly
106 second handle
108 fastener

DETAILED DESCRIPTION OF THE PREFERRED EMBODIMENT

In accordance with the invention, the best mode is presented in terms of the described embodiments in FIGS. 1 through 6. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

The present invention describes a wide variety of cookware having multiple compartments that are formed by vertical first divider assemblies 40. Preferably a first divider assembly 40 bisects an inner volume of a cookware. The first divider assembly 40 enables a user to cook different foods at the same time, such as meat and a vegetable, or a sauce and a main entrée. Cookware with first divider assemblies 40 are envisioned as being introduced with different diameters, depths, attractive external designs, and being made using various conventional materials as used in the manufacture of cookware. Inclusion of a first divider assembly 40 in a cookware reduces the number of cookware needed, reduces carrying, transportation, and cleaning efforts, and simplifies preparing meals.

Referring now to FIG. 1, a perspective view of a pan embodiment 20, the pan embodiment 20 includes a two-part lid assembly having a first half lid 60*a* and a second half lid 60*b*. The pan embodiment 20 is depicted and illustrated as being shallow; however, that is not a limitation of the present invention. Furthermore, the principles of the present invention are fully applicable to other types of cookware (such as the described pots 100 and skillets 80, and other cookware such as sauce pans, strainers, and the like).

The pan embodiment 20 has a unitary construction with a vertical side 22, a bottom 24, and a first handle 26. Additionally, the pan embodiment 20 includes a removable vertical first divider assembly 40 which bisects the inner volume of the pan embodiment 20. The first divider assembly 40 has drain apertures 45 which allowing fluids 92 to migrate between the two (2) halves of the pan embodiment 20 (also see FIG. 4).

Figure 4:
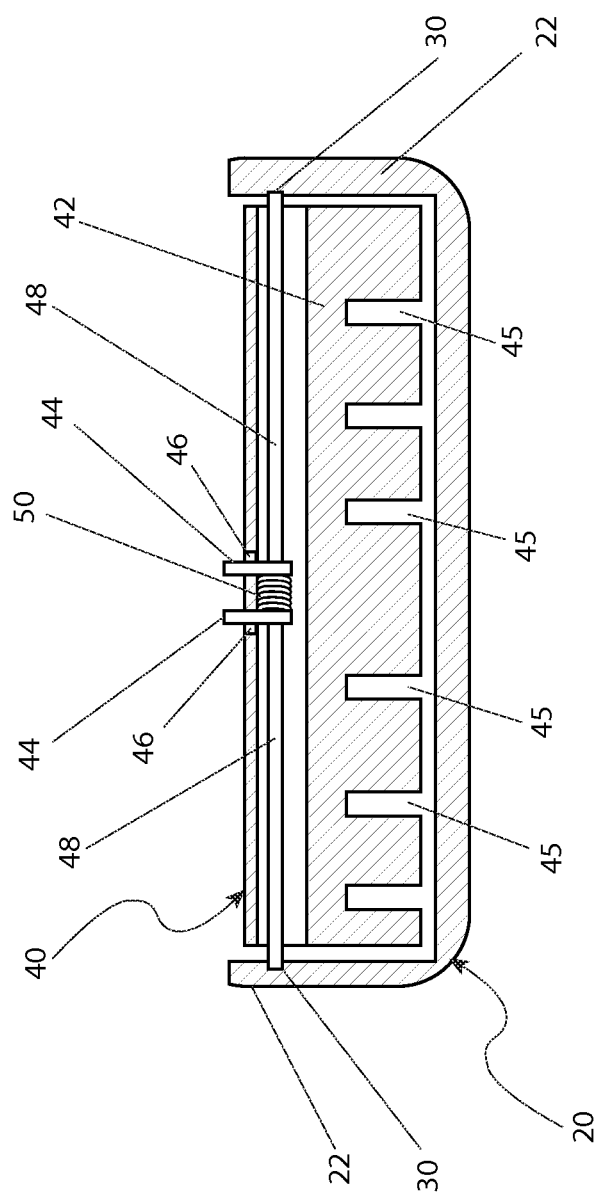
FIG. 4 is a section view of the pan embodiment 20 taken along section line A-A of FIG. 1.

The first divider assembly 40 includes a removable locking attachment to attach to the pan side 22. That locking attachment includes a pair of spring-loaded locking rods 48, which are best shown in FIG. 4. The first divider assembly 40 may be removed by squeezing a pair of actuating pins 44 together. This pulls the spring-loaded locking rods 48 in, releasing the first divider assembly 40 from the pan side 22, thereby enabling removal of the first divider assembly 40. Thus the pan embodiment 20 can selectively function as a normal pan. Again, also reference FIG. 4.

The first handle 26 is a securely fastened, elongated, ergonomic structure suitable for grasping and lifting the pan embodiment 20. The first handle 26 beneficially includes an insulated covering 27, preferably rubberized. The insulated covering 27 is envisioned as covering part or all of the first handle 26 to improve gripping and providing thermal insulation protection.

The pan embodiment 20, as well as the subsequently described alternate embodiments 80, 100, utilizes a split or two-piece lid assembly having the first half lid 60a and a second half lid 60b. Each half lid 60a, 60b is a semi-circular structure which fits across about half of the top of the pan embodiment 20. The half lids 60a, 60b are configured to have a clearance gap 61 for the first divider assembly 40. The half lids 60a, 60b respectively include a semi-circular first lid top 62a and a semi-circular second lid top 62b. The half lids 60a, 60b also have, respectively a first lid side 64a and second lid side 64b, both of which extend down to form semi-circular open-bottomed enclosures.

The half lids 60a, 60b are used as individual lids for the separate compartments so as to cover food on one (1) side of the pan embodiment 20, but not the other. Each half lid 60a, 60b has a top steam release aperture 70. In addition, each half lid 60a, 60b includes a number of equally-spaced circular first vent apertures 68 that are located along the lid sides 64a, 64b.

The lid halves 60a, 60b also have, respectively, a first handle half 66a and second handle half 66b. The first handle half 66a and the second handle half 66b support joining, grasping, and removing the half lids 60a, 60b from the pan embodiment 20. Each handle half 66a, 66b represents a vertically bisected half of a split "T"-shaped knob which is affixed to the lid halves 60a, 60b using fasteners 108 such as a rivet, screw, or the like, see FIG. 6. When both half lids 60a, 60b are on the pan embodiment 20 the flat sides of each handle half 66a, 66b are adjacent and emulate a normal knob.

Referring to FIG. 6, the first handle half 66a has a horizontally-sliding locking pin 74 having an external integral knob 72. When pressed in with both half lids 60a, 60b adjacent one (1) another, the locking pin 74 slides into a locking pin aperture 76 in the second handle half 66b. This mechanically joins the handle halves 66a, 66b into a single knob. This allows a user to jointly grasp the handle halves 66a, 66b and safely remove both lid halves 60a, 60b simultaneously.

It is understood that the half lids 60a, 60b may be utilized upon other cookware such as the embodiments 20, 80, 100 subsequently described in like manner with equal benefit. Thus the half lids 60a, 60b are not limited to use with the pot embodiment 20.

Figure 5:
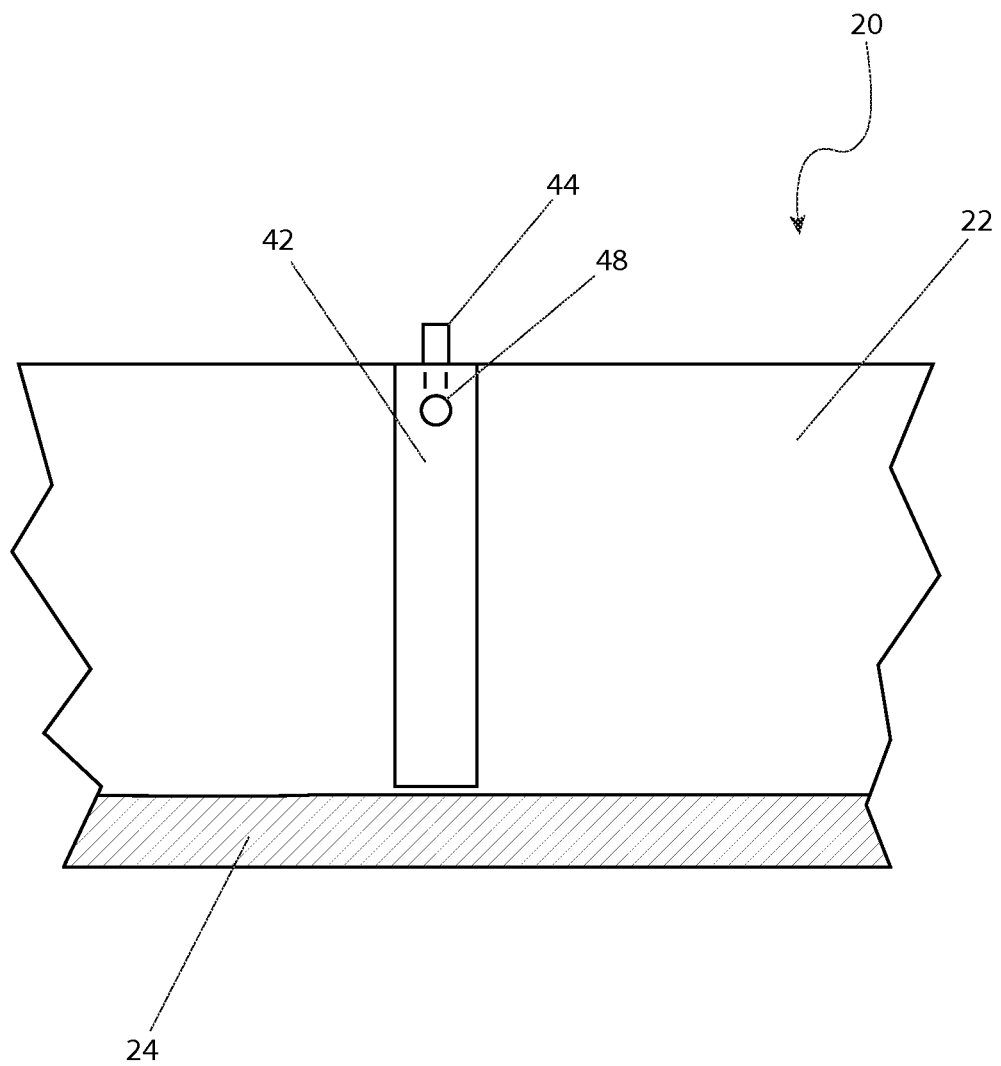
FIG. 5 is a section view of the pan embodiment 20 taken along section line B-B of FIG. 1; and, FIG. 6 is a section view of the lids 60*a*, 60*b* taken along section line C-C of FIG. 1.

Referring now to FIGS. 4 and 5, respectively section views A-A and B-B of the pan embodiment 20 (see FIG. 1); the first divider assembly 40 is positioned within the pan embodiment 20 to create two (2) compartments. The first divider assembly 40 has a vertically rectangular body 42 that is dimension to fit across the pan side 22 while residing on the pan bottom 24. The first divider assembly 40 forms a removable attachment to the pan side 22 via the locking rods 48 which protrude from upper opposing ends of the divider body 42. The locking rods 48 slide into respective rod apertures 30 formed or drilled at corresponding locations into the pan side 22.

The first divider assembly 40 has internal components, including a pair of actuating pins 44, the locking rods 48, and a compression spring 50. The compression spring 50 acts to horizontally bias the locking rods 48. The locking rods 48 are mirror-image linear devices located within an upper part of the divider body 42. The locking rods are biased outward by the spring 50 which is positioned between the locking rods 48. Each locking rod 48 has an integral actuating pin 44 located to extend perpendicularly upward through a pin slot 46 that is formed or machined into the top of the divider body 42. The actuating pin enables manipulating the locking rods 46. In use, a user squeezes the actuating pins 44 together, which causes the locking rods 48 to withdraw from or move into the rod apertures 30. This allows removing or installing the first divider assembly 40.

The pan embodiment 20 is illustrated as bisected into equal semi-cylindrical compartments by one first divider assembly 40; however, it is understood that different cookware embodiments may be introduced having one (1) or more differently positioned first divider assemblies 40. Such will provide cooking compartments having various divided volumes. As such, a bisected pan embodiment should not necessarily be interpreted as a limiting factor. It is understood that the half lids 60a, 60b would be then be correspondingly shaped, and the respective rod aperture 30 appropriately located.

Figure 2A:
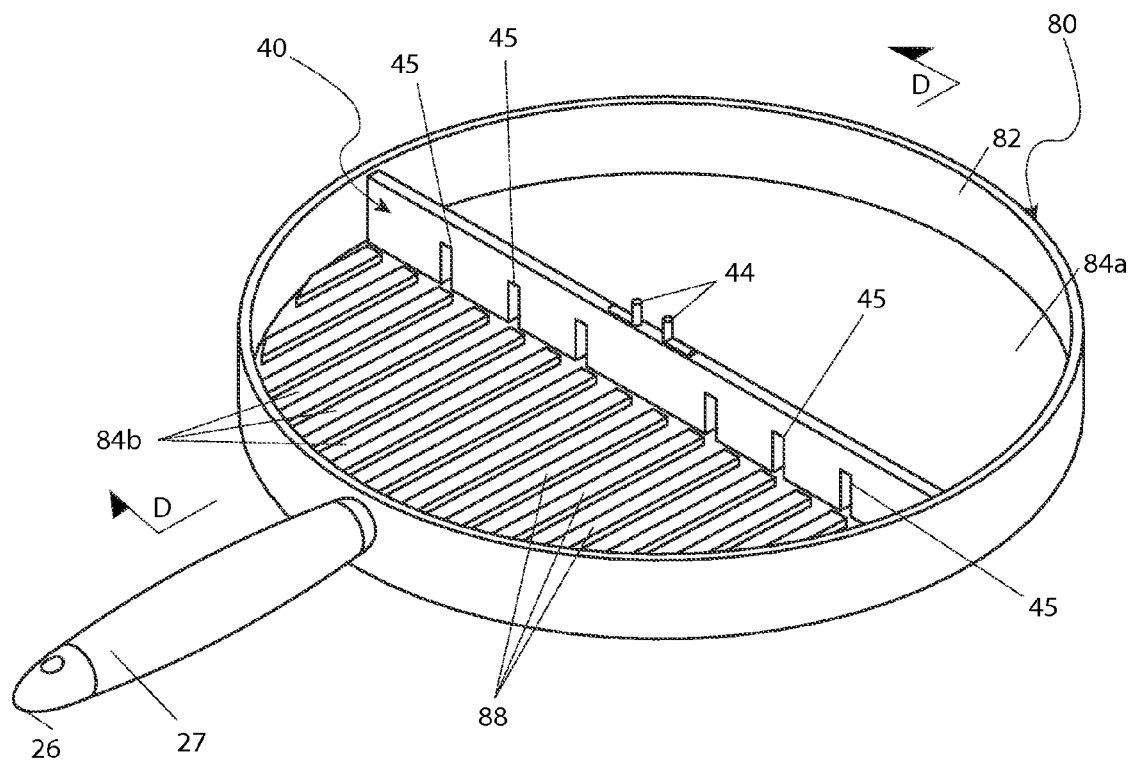
FIG. 2*a* is a perspective view of a skillet embodiment 80 cookware that is in accord with an alternate embodiment of the present invention.
Figure 2B:
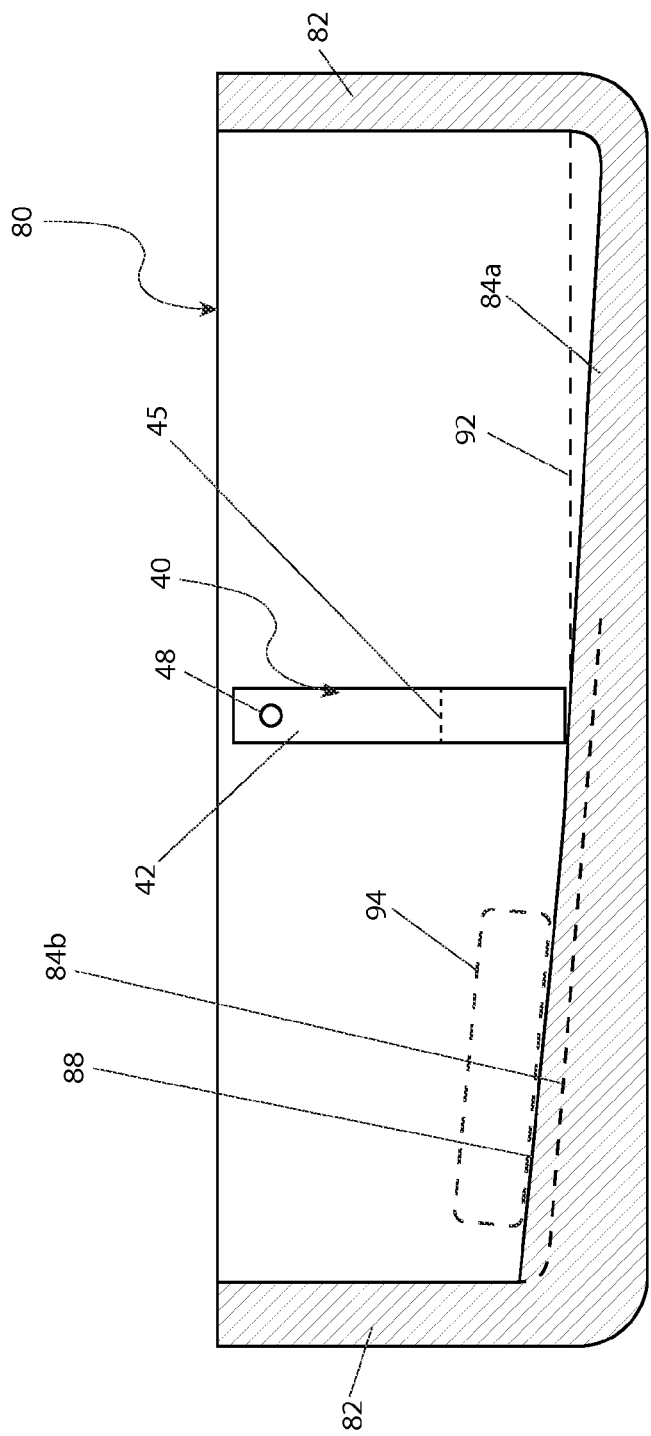
FIG. 2*b* is a section view of the skillet embodiment 80 cookware taken along section line D-D of FIG. 2*a*.

Refer now to FIGS. 2a and 2b, respectively perspective and section views of a skillet embodiment 80. The skillet embodiment 80 isolates foodstuffs 94 such as hamburgers and steaks on one (1) side of the first divider assembly 40 while enabling juices 92 to migrate through drain apertures 45 and away from the foodstuffs 94. The skillet embodiment 80 includes a skillet side 82, a first handle 26, and the half lids 60a, 60b as in the previously described pan embodiment 20. However, the skillet embodiment 80 has an embellished bottom with ribs 88 defined in an inclined upper ribbed bottom 84b and an inclined lower flat bottom 84a. The ribbed bottom 84b and the flat bottom 84a allow cooking such that fluids 92 such as grease, fat, and oil drain from food in the ribbed bottom 84b bottom through the drain aperture 45 and into the flat bottom 84a.

As in the previously described pan embodiment 20, the skillet embodiment 80 has the first divider assembly 40.

Figure 3:
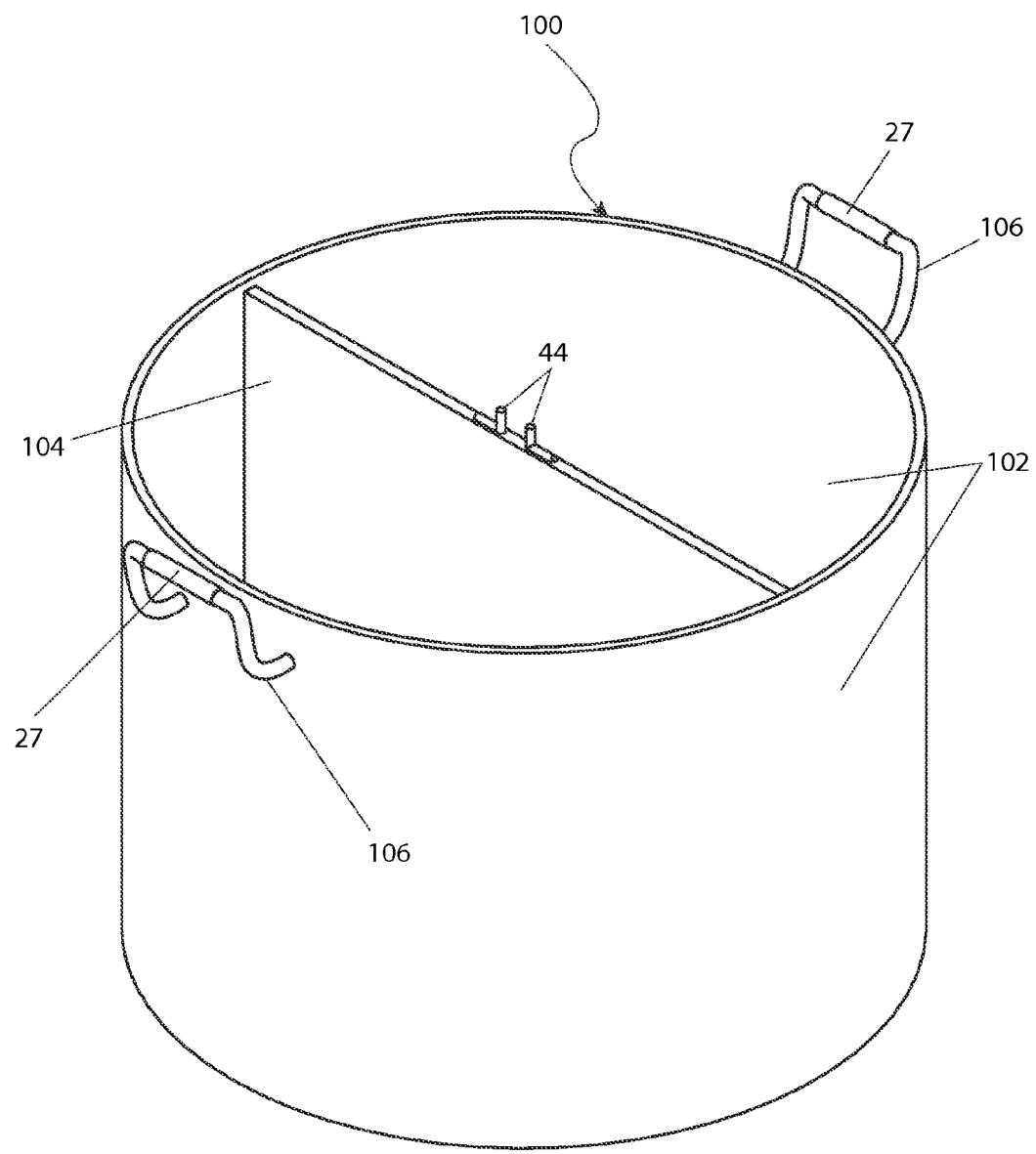
FIG. 3 is a perspective view of a pot embodiment 100 cookware that is in accord with an alternate embodiment of the present invention.

Refer now to FIG. 3 for a perspective view of a pot embodiment 100 that is in accord with the present invention. The pot embodiment 100 includes an elongated pot side 102 having respective suitably shaped and secured second handles 106. The second handles 106 preferably are rubberized surfaces 27 that provide good gripping and thermal protection. The pot embodiment 100 provides a large volume for foodstuffs 94 (see FIG. 2b) while being bisected by a correspondingly elongated second divider assembly 104. The second divider assembly 104 is envisioned as being removably attached and secured in the same manner as the first divider assembly 40. Thus the second divider 104 includes actuating pins 44, locking rods 48, a compression spring 50, and a pin slot 46. Furthermore, the pot side 102 includes rod apertures 30. This allows removing or installing the second divider assembly 104 as required.

It is envisioned that other styles and configurations of the present invention can be easily incorporated into the teachings of the present invention. While only three particular configurations have been shown and described, that is only for purposes of clarity and disclosure and not by way of limitation of scope.

The preferred embodiment of the present invention can be utilized by the common user in a simple and effortless manner with little or no training. After initial purchase or acquisition, it would be assembled as indicated in FIG. 1.

The method of installing and utilizing each embodiment 20, 80, 100 may be achieved by: installing the divider assembly 40 into either an embodiment 20, 80, 100 by manually squeezing the actuating pins 44 together to retract the locking rods 48; inserting the bottom of the divider assembly 40; aligning the locking rods 48 with respective rod apertures 30; releasing the actuating pins 44 to allow the locking rods 48 to extend into the rod apertures 30 to secure the divider assembly 40 to the embodiment 20, 80, 100; loading foodstuffs 94 such as, a meat item and a vegetable, or a sauce and a main entrée, or the like, into the compartments on each side of the divider assembly 40; grasping the first handle half 66*a* of the first half lid 60*a* and placing it onto half of the embodiment 20, 80, 100; grasping the second handle half 66*b* of the second half lid 60*b* and placing it onto the remaining half; placing the embodiment 20, 80, 100 into or onto a heat source such as an oven or a range; removing a half lid 60*a*, 60*b* by lifting a respective handle half 66*a*, 66*b* to check, stir, or add ingredients to the embodiment 20, 80, 100; removing both of the half lids 60*a*, 60*b* coincidentally to check, stir, or add ingredients by locking the half handles 66*a*, 66*b* together by pressing inwardly on the knob 72 to engage the integral locking pin 74 into the locking pin aperture 76 of the second handle half 66*b*; replacing the lid halves 60*a*, 60*b*; allowing the foodstuffs 94 to cook in a normal manner until finished; removing the embodiment 20, 80, 100 from the heat source and serving the foodstuffs 94 in a conventional manner; and, benefiting from a reduced number of cookware vessels required to prepare meals afforded a user.

It is further understood that any of the embodiments 20, 80, 100 may be utilized without using the divider assembly 40 to cook foodstuffs 94 in a similar manner as conventional cookware pieces.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A lid assembly, comprising:
   a first partial lid having a first lid top and a first lid side extending down from said first lid top to form a first open-bottomed enclosure;
   a top steam release aperture through said first lid top;
   at least one vent aperture through said first lid side;
   a second partial lid having a second lid top and a second lid side extending down from said second lid top to form a second open-bottomed enclosure; and,
   a first handle half on said first lid top and a second handle half on said second lid top;
   wherein said first handle half and said second handle half are halves of a vertically bisected "T"-shaped knob;
   wherein said first partial lid and said second partial lid can be located adjacent each other such that said first handle half and said second handle half emulate said "T" shaped knob.

2. The lid assembly according to claim 1, wherein said first handle half is attached to said first lid top by a fastener.

3. The lid assembly according to claim 1, wherein said first handle half includes a horizontal sliding locking pin having an external integral knob; said second handle half includes a locking pin aperture; and wherein said locking pin slides into said pin aperture to join said first handle half and said second handle half together.

4. A cookware assembly, comprising;
   a vertical side having lock receiving features;
   a bottom; and,
   a removable vertical divider assembly having a body and a locking attachment for attaching said body to said vertical side using via said lock receiving features;
   wherein said locking attachment includes a first locking rod, a second locking rod, and a spring biasing said first locking rod away from said second locking rod.

5. The cookware assembly according to claim 4, wherein said divider assembly includes at least one drain aperture for allowing fluids to migrate under said divider assembly.

6. The cookware assembly according to claim 4, wherein said lock receiving features are rod apertures for receiving said first locking rod and said second locking rod.

7. The cookware assembly according to claim 6, further including a first actuating pin attached to said first locking rod and a second actuating pin attached to said second locking rod, wherein pinching said first actuating pin and said second actuating pin together moves said first locking rod and said second locking rod toward one another.

8. The cookware assembly according to claim 7, wherein said bottom includes a plurality of ribs.

9. The cookware assembly according to claim 8, wherein said bottom includes an inclined upper ribbed bottom and a lower inclined flat bottom.

10. A cookware vessel, comprising;
    a vertical side having a top and lock apertures;
    a bottom;
    a removable vertical divider assembly having a body and a locking attachment to attach to said vertical side using said lock apertures; and,
    a lid assembly having a first partial lid with a first lid top and a first lid side that extends down from said first lid top to form a first open-bottomed enclosure, said lid assembly further including a second partial lid having a second lid top and a second lid side that extends down from said second lid top to form a second open-bottomed enclosure;
    wherein said lid assembly fits on said top;
    wherein said locking attachment includes a first locking rod, a second locking rod, and a spring biasing said first locking rod away from said second locking rod; and,
    wherein said first locking rod and said second locking rod fit into said lock apertures.

11. The cookware vessel according to claim 10, wherein said divider assembly includes at least one drain aperture for allowing fluids to migrate under said divider assembly.

12. The cookware vessel according to claim 10, wherein said bottom includes an inclined upper ribbed bottom and a lower inclined flat bottom.

\* \* \* \* \*